US006514574B1

(12) United States Patent
Valeri et al.

(10) Patent No.: US 6,514,574 B1
(45) Date of Patent: Feb. 4, 2003

(54) PROCESS FOR MAKING AN ABRASION RESISTANT COATING ONTO AN ORGANIC GLASS SUBSTRATE

(75) Inventors: Robert Alan Valeri, Tampa, FL (US); Kimberly Denise Anderson, St. Petersburg, FL (US); Sidney Shaw White, Jr., North Seminole, FL (US)

(73) Assignee: Essilor International Compagnie Generale d'Optique, Charenton Cedex (FR)

( * ) Notice: Subject to any disclaimer, the term of this patent is extended or adjusted under 35 U.S.C. 154(b) by 0 days.

(21) Appl. No.: 09/607,542

(22) Filed: Jun. 29, 2000

(51) Int. Cl.[7] .................................................. C08J 7/04

(52) U.S. Cl. ...................... 427/515; 427/164; 427/386; 427/387; 427/393.5; 427/557; 427/558; 427/559

(58) Field of Search ................................ 427/515, 557, 427/558, 559, 164, 386, 387, 393.5

(56) References Cited

U.S. PATENT DOCUMENTS 4,211,823 A 7/1980 Suzuki et al. ............... 428/412
6,008,285 A 12/1999 Kasemann et al. ......... 524/430

FOREIGN PATENT DOCUMENTS

| | | |
|---|---|---|
| GB | 2 230 783 | 10/1990 |
| GB | 2 317 386 | 3/1998 |
| WO | WO 94/10230 | 5/1994 |

*Primary Examiner*—Bernard Pianalto
(74) *Attorney, Agent, or Firm*—Fulbright & Jaworski L.L.P.

(57) ABSTRACT

The process comprises, (a) adding to a polymerizable composition containing a component A comprising at least one silane compound containing at least one epoxy group and at least two alkoxy groups directly bonded to the Si atom of the molecule or hydrolysate thereof and a component B comprising fine particles of silica, an effective amount of at least one cationic photopolymerization initiator and an effective amount of at least one thermal polymerization catalyst, (b) coating at least one surface of the substrate with the composition resulting from step (a), (c) submitting the coated substrate to a photopolymerization step for pre-curing the coating layer; and thereafter, (d) submitting the substrate with the pre-cured coating layer thereon to a thermal curing at a predetermined temperature and for a predetermined time to complete curing of the coating layer.

14 Claims, No Drawings

PROCESS FOR MAKING AN ABRASION RESISTANT COATING ONTO AN ORGANIC GLASS SUBSTRATE

BACKGROUND OF THE INVENTION

The present invention relates, generally, to a process for forming an abrasion-resistant coating on solid substrates made of organic glasses such as ophthalmic lenses or other optical articles, and more particularly to a process for forming such an abrasion-resistant coating from a photochemically and thermally curable composition containing at least one epoxypolyalkoxysilane.

While ophthalmic lenses made of organic glasses benefit of ease of manufacture, lower cost than mineral glass, and being light in weight, they are easily scratched, therefore, requiring application of an abrasion-resistant coating to compete with abrasion resistance of mineral glass lenses;

Finished single vision lenses and semi-finished lenses quite often have an abrasion-resistant coating applied at the lens manufacturing site. In the case of the finished single vision lens, the optician or the laboratory needs only to edge the lenses for adjustment to the frame prior to dispensing. However, in the case of semi-finished lenses, the optician or the laboratory must surface the back of the lenses to prescription prior to edging and adjusting the lenses to the frames. This surfacing leaves the back or concave surface of the lenses uncoated. Opticians or dispensing laboratories may, of course, apply a UV curable composition on the back side of the lenses using a laboratory spin coater and then cure the composition using UV radiation. UV curing of these known UV curable compositions for making abrasion-resistant coatings is a relatively fast process, however, the resulting coatings although very scratch resistant suffer from a somewhat insufficient resistance to abrasion.

Polysiloxane "hard" coatings which exhibit very high abrasion resistance are also well known in the art. These coatings are typically formed by thermally curing a precursor composition including a hydrolysate of epoxyalkoxysilanes, silica and a thermal curing catalyst. Thermal curing is effected using thermal convection ovens with curing times that usually exceed 1 hour.

Compositions for making such polysiloxane "hard" coatings and the thermal curing thereof are disclosed, for example in U.S. Pat. No. 4,211,823.

In order to overcome the problem of long time curing associated with the above heat curable epoxyalkoxysilane based compositions, similar compositions curable by UV irradiation have been proposed, such as in document WO 94/10230. However, as indicated above, the resulting coatings exhibit abrasion resistances which are inferior than those of the thermally cured coatings.

Thus, one object of the present invention is to provide a process for curing an epoxyalkoxysilane based composition which results in an abrasion-resistant coating having abrasion-resistant properties as good as the classical thermally cured polysiloxane "hard" coatings but which needs a very short curing time compared to the usual thermal curing.

In particular, the process of the invention allows curing times of a few minutes and even of one minute or less while still resulting in a final abrasion-resistant coating as good as the classical thermally cured polysiloxane "hard" coatings.

A further object of the present invention is an epoxyalkoxysilane based composition specifically formulated for being cured according to the process of the invention.

SUMMARY OF THE INVENTION

According to the invention, there is provided a process for making an abrasion-resistant coating onto at least one surface of a substrate made of an organic glass which comprises:

(a) preparing a polymerizable composition containing a component A comprising at least one silane compound containing at least one epoxy group and at least two alkoxy groups directly bonded to the Si atom of the molecule or a hydrolysate thereof and a component B comprising fine particles of silica, an effective amount of at least one cationic photopolymerization initiator and an effective amount of at least one thermal polymerization catalyst;

(b) coating at least one surface of the substrate with the composition resulting from step (a);

(c) submitting the coated substrate to a photopolymerization step for pre-curing the coating layer; and thereafter, (d) submitting the substrate with the pre-cured coating layer thereon to a thermal curing at a predetermined temperature and for a predetermined time to complete curing of the coating layer.

DETAILED DESCRIPTION OF THE INVENTION

The main components of the curable compositions for use in the process of the present invention are well known in the art and are disclosed in U.S. Pat. No. 4,211,823 and WO 94/10230.

These compositions contain as one of the main component a constituent A comprising an epoxyalkoxysilane or a mixture of epoxyalkoxysilanes or a hydrolysate thereof. The epoxyalkoxysilanes of the compositions of the instant invention contain at least one epoxy group and at least two alkoxy groups which are directly bonded to the silicon atom in the molecule.

The preferred epoxyalkoxysilanes are compounds of formula:

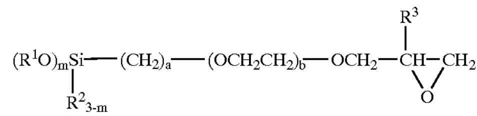

wherein $R^1$ is an alkyl or alkoxy alkyl group having 1 to 4 carbon atoms; $R^2$ is an alkyl or aryl group having 1 to 6 carbon atoms; $R^3$ is hydrogen or methyl group; m is 2 or 3; a is an integer from 1 to 6; and b is 0,1 or 2.

Among the preferred epoxyalkoxysilanes there may be cited γ-glycidoxypropyltrimethoxysilane, γ-glycidoxypropyltriethoxysilane, γ-glycidoxypropylmethyldimethoxysilane, γ-glycidoxypropylmethyldiethoxysilane and γ-glycidoxyethoxypropylmethyldimethoxysilane. The most preferred epoxyalkoxysilane is γ-glycidoxypropyltrimethoxysilane.

The amount of epoxyalkoxysilanes in the compositions generally ranges from 15 to 35% by weight.

The constituent A may also contain silane compounds or hydrolysates of silane compounds of formula:

$$R^4_c R^5_d Si Z_{4-(c+d)}$$

Wherein $R^4$ and $R^5$ are substituted or non substituted alkyl, alkenyl or aryl groups; Z is an alkoxy, alkoxyalkoxy or acyloxy group; c and d are 0,1 or 2; and c+d is 0,1 or 2.

Among these silane compounds there may be cited tetraalkoxysilanes such as methylsilicate, ethylsilicate, n-propylsilicate; trialkoxysilanes, trialkoxyalkoxysilanes and triacyloxy silanes such as methyltrimethoxysilane, methyltriethoxysilane, vinyltrimethoxysilane, vinyltriethoxysilane, vinyltrimethoxyethoxysilane, vinyltriacetoxysilane, phenyltrimethoxysilane, phenyltriethoxysilane, γ-chloropropyltrimethoxysilane, γ-fluoropropyltrimethoxysilane, methacryloxypropyltrimethoxysilane and dialkoxysilanes such as dimethyldimethoxysilane, and methylphenyldimethoxysilane.

Hydrolysates of tetraalkoxysilanes and trialkoxysilanes or mixtures thereof are preferred.

The amount of these silanes in the compositions usually ranges from 15 to 35% by weight.

Hydrolysates are prepared by adding pure water or diluted aqueous hydrochloric acid, sulfuric acid, acetic acid, phosphoric acid or the like. Hydrochloric acid or sulfuric acid are preferred. Hydrolysis may be carried out with or without addition of solvent. Various solvents such as alcohol, ketones, halogenated hydrocarbon, aromatic hydrocarbon and mixtures thereof may be used.

Component A may also include other epoxy compounds such as polyglycidyl ethers and esters.

The second constituent B of the coating compositions comprises fine particles of silica, usually colloidal silica.

The amount of silica present in the compositions typically ranges from 2.5 to 50% by weight based on the total weight of the composition.

Typically, the colloidal silica used in this invention may have particle size of 1 nm to 1000 nm, preferably of 4 to 100 nm and more preferably of 10 to 60 nm. The silica may be dispersed in or have crystal-like particles in an aqueous or polar solvent or a combination of both. In general, the silica particles are dispersed in, preferably acidified, water, alcohol or water-alcohol mixtures. The preferred alcohols are methanol, ethanol, isopropanol, butanol, polyethylene glycol or combinations thereof.

The pH of the liquid coating composition is generally maintained between 3 and 5 to prevent gelation. If necessary, the pH can be adjusted by using HCl or NaOH.

The photoinitiators suitable for use in the coating compositions are those that induce a cationic cure when the compositions are irradiated with ultraviolet radiation. Examples of cationic photoinitiators are aromatic onium salts and iron arene salt complexes. Suitable photoinitiators are disclosed in U.S. Pat. Nos. 3,981,897, 4,058,401, 4,101,513, 4,138,255, 4,161,471 and in WO 94/10230, the teachings of which are incorporated herein by reference.

Examples of suitable photosensitive aromatic onium salts include triphenylselenonium, hexafluoroantimonate, triphenylsulfonium hexafluoroantimonate, triphenylsuflonium, hexafluorophosphate and bis(4-dodecylphenyl)-iodonium hexafluoroantimonate. Other cationic photoinitiators may also be used. Preferred photoinitiators are that produced by CIBA-GEIGY under the trade names IRGACURE 261 and UVI 6974.

The amount of photoinitiators present in the compositions usually ranges from 0,1 to 3% by weight.

The compositions also include an effective amount of at least one thermal curing catalyst. These thermal curing catalysts are preferably titanium complexes. A preferred catalyst is the compound of formula:

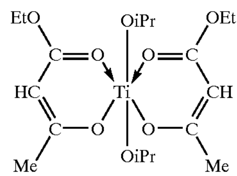

This catalyst is commercialized under tradename TYZOR® DC.

The amount of thermal curing catalyst used in the compositions ranges from 0,01 to 5% by weight based on the total composition weight.

It may be desirable to add to the coating composition a surface active agent. The surface active agent may be non-ionic or ionic. Suitable non-ionic surfactants include compounds from fluorochemicals such as FC-430 manufactured by 3M Company, fluorinated alkylalkoxylates, fluorinated alkyl sulfoamides, fluorinated alkyl esters, monoglyceryl series, the sorbitan fatty acid ester, the cane sugar esters, the polyoxyethylene ethers of higher fatty acids, the polyoxyethylene esters of higher fatty acids, the polyoxyethylene ethers of sorbitan esters, the fatty acid alkanolamides, polyoxyethylenes and polyoxypropylenes. Concentration of the surfactant should be greater than 0.01% by weight and preferably between 0.01 and 5% by weight, based on the total weight of the composition.

Other additives such as leveling agents and viscosity modifiers may be included in the coating compositions by simple mixing. Examples of useful leveling agents are silicone surfactants such as copolymers of lower alkylene oxide and lower polydimethylsiloxane.

When preparing a coating composition for the process of the invention, the total solids content of the composition should, preferably, be between 10% to 50% by weight, with one or a mixture of solvents comprising the remainder of the formulation. Solvents useful in the practice of this invention include low molecular weight alcohols or alcohol-water mixtures, such as methanol, butanol, isopropanol and mixtures thereof; ketones, esters, glycol ethers, cellosolve, organic halides, carboxylic acids, aromatic compounds, and mixtures thereof.

The epoxyalkoxysilane is relatively easily hydrolysed in water or in an aqueous solution including hydrochloric acid, sulfuric acid, acetic acid, phosphoric acid and the like. The hydrolysis may take place in the presence or absence of a solvent, and preferably may take place utilizing the excess acidic water in the colloidal silica.

When the thermal catalyst is a titanium compound and especially a titanium complex, the coating compositions exhibit better performances if no water is added to the formulation. Then there are only traces of water from the silanes, colloidal silica and organic solvent(s).

On the contrary, when the thermal catalyst is an aluminum compound and especially an aluminum chelate, it is recommended to use an epoxysilane hydrolysate. In that particular case, the hydrolysis may be performed in situ during the curing of the coating but it is preferred to use previously hydrolysed epoxysilanes. The duration of the previous hydrolysis step is long: several hours, preferably 7–12 hours.

The transparent organic glass substrates preferably used in the present invention include (meth)acrylic resins, diethyleneglycol bisallyl carbonate copolymers, (halogenated) bisphenol-A di(meth)acrylate homopolymers and copolymers, and halogenated)bisphenol-A urethane-modified di(meth)acrylate homopolymers and copolymers and polyurethanes. The preferred organic glass substrates are diethyleneglycol bisallyl carbonate copolymers such as CR-39® commercialized by PPG INDUSTRIES.

The coating composition can be applied to the substrate surface using any usual method, such as dipping, spin coating, roll coating, curtain flow coating, flow coating, and spray coating. Preferably, application of the coating composition is effected by spin coatings which allows very short coating times of less than 30 seconds (typically about 20 s).

The thickness of the composition as applied to the substrate can be selected within a broad range to meet the predetermined purpose or objective. Typically, the coating thickness ranges from 0.5 to 10 micrometers, preferably from 2 to 5 micrometers.

The photopolymerization step of the process of the present invention comprises irradiating the coated substrate with UV radiation. These irradiation steps with UV radiation are well known in the art. Duration of irradiation will of course depend on the power of irradiation, the formulation of the composition, the thickness of the coating and the desired degree of pre-curing. However, the present process allows using very short UV irradiation steps of less than 1 minute and even less than 40 seconds, typically about 35 seconds.

The temperature of the thermal curing step of the present invention generally ranges from 50 to 500° C., preferably from 200° C. to 500° C., more preferably 300 to 400° C.

The duration of this thermal curing obviously will depend on the curing temperature, formulation of the coating composition and thickness of the coating. However, the present process allows the use of very short thermal curing times of less than 1 minute, typically of about 40 seconds.

Heating may be effected using any known means commonly used in the art for thermal curing, such as oven or infra-red radiation. Heating using infrared IR radiation is preferred since such a heating allows obtaining high temperature within very short periods of time.

The coated substrate is generally maintained at a distance of from 2 centimeters to 20 centimeters, preferably 5 to 10 centimeters, from the very high temperature IR source, during the heating step.

The present process thus may provide an overall coating process of a duration of less than 2 minutes.

Without being tied up by a theory, it is believed that UV irradiation of the composition in presence of the cationic photoinitiators opens the epoxy ring providing a mechanism for the coating to cure and bond to the substrate surface. During the later thermal curing step, the condensation catalyst allows cross-linking of the silanol portion of the silane with colloidal silica present in the coating composition.

After cooling to ambient temperature the resulting abrasion-resistance coating exhibits performances equal or even superior to polysiloxane "hard" coatings obtained by the prior art processes.

Because a significant amount of epoxy groups must be present for the photopolymerization step for optimum performances of the process, the coating shall preferably be cured within three to four hours after it has been formulated. After four hours very little if any epoxy groups remains unreacted.

Due to the very short duration of the overall coating process of the invention, this process will enable laboratories and/or opticians to dispense surfaced semi-finished lenses with an abrasion-resistant "back" coating similar to the factory applied abrasion-resistant coating found on the front or convex face of the lenses.

The following examples illustrate the present invention;

Unless otherwise stated all percentages and parts are by weight.

EXAMPLES 1 AND 2 AND COMPARATIVE EXAMPLES A AND B

A coating composition comprising the components indicated in table I below is prepared according to the following procedure:

1. A one per cent solution of TYZOR® DC in diacetone alcohol is added to n-propanol and stirred for 5 minutes.
2. The UVI 6974 photoinitiator is then added and stirring is pursued for approximately one minute.
3. The MA-ST (colloïdal silica dispersed in methanol) is then slowly added to the stirred mixture over a period of approximately 5 minutes.
4. The 0.1 N HCl is then added to the stirred mixture and stirring is pursued for 5 minutes.
5. A premixed solution of FC-430 in methanol in a ratio of one-to-one (1:1) is then added and stirring is pursued for 30 minutes.

The above "stock" solution is stable in excess of one month.

Prior to coating, the glycidoxypropyltrimethoxysilane (GLYMO) is mixed with stock solution to obtain the coating composition.

TABLE I

| COMPONENT | % BY WEIGHT |
|---|---|
| Glycidoxypropyltrimethoxysilane (GLYMO) | 27.13 |
| 0.1 N HCl | 4.12 |
| n-Propanol | 21.7 |
| Colloidal Silica (30% solid content) in methanol | 46.12 |
| UVI-6974 Photoinitiator | 0.81 |
| Tyzor ® DC (pure) | 0.01 |
| Flourad ® FC-430 Surfactant | 0.11 |

UVI-6974

Mixture of:

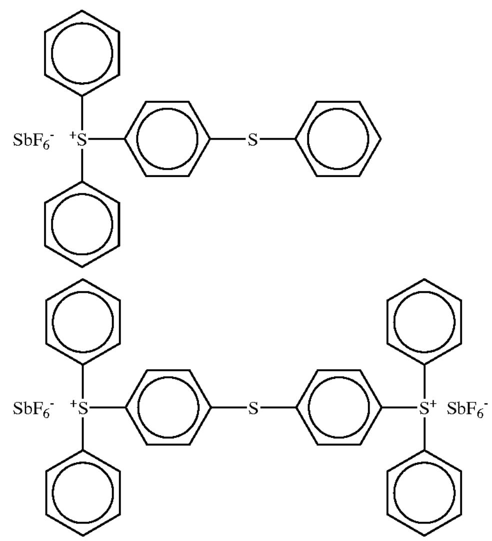

The above composition was applied on both the concave and the convex faces of 2 mm thickness plano ophthalmic lenses made of CR 39® polymer.

In example 1 the lens was only coated with the abrasion-resistant coating whereas in example 2 the abrasion-resistant coating was further coated with an anti-reflecting coating as described hereafter.

The abrasion-resistant coating composition was deposited by spin coating in 20 seconds using the following conditions:

Centrifugal speed application at 600 rpm for 8 seconds with a final speed of 1700 rpm.

Flow rate: 2 ml applied from the outer edge of the lens to the center at a rate of 0.5 ml/second.

The coated lenses were then submitted to a curing process according to the invention using the following conditions:

1) UV curing

Power

UVA: 1.56 J/cm$^2$ (0.848 w/cm$^2$)

UVB: 1.473 J/cm$^2$ (0.771 w/cm$^2$)

UVC: 0.199 J/cm$^2$ (0.101 w/cm$^2$)

UVV: 1.136 J/cm$^2$ (0.101 w/cm$^2$)

Lamps used Fusion H bulb

Distance of samples from UV source: 12 centimeters

Duration: about 35 seconds

2) Thermal curing

IR lamps Lesco EZ-IR Cure System Model FBM 1004

Distance from lamps: 5 centimeters

Temperature of the IR source: 427° C.

Duration: about 40 seconds.

The anti-reflecting coating was then applied on both faces of the lenses (on the abrasion-resistant coating) by deposition, under vacuum, of the following successive layers:

| | Material | Optical thickness (nm) |
|---|---|---|
| First layer | $ZrO_2$ | 55 |
| Second layer | $SiO_2$ | 30 |
| Third layer | $ZrO_2$ | 160 |
| Fourth layer (upper layer) | $SiO_2$ | 120 |

The optical thicknesses are given for λ=550 nm.

The thickness of the resulting abrasion-resistant coatings was: 2 μm+/−0.1 μm.

The ISTM Bayer abrasion resistance, steel wool resistance, haze, dry adhesion, and adhesion after 30 minutes in boiling water of the coated lenses were tested and the results are reported in table II.

For comparison purposes, the same measurements are performed on a CR39® lens having a hard coat treatment DURALENS (Example A) and commercialized by ESSILOR of America. The lens of example A has no anti-reflective coat.

In example B, a CR39® lens having an anti-reflective hard coat treatment CRYZAL® is evaluated.

The results for examples A and B are reported in table II.

TABLE II

| | EX. 1 | EX. 2 | EX. A | EX. B |
|---|---|---|---|---|
| ISTM BAYER | 4.3 | 2.52 | 3 | 1.9 |
| STEEL WOOL | 0.1 | 0.1 | 0.5 | 0.5 |
| ASTM HAZE | 0.1 | 0.1 | 0.5 | 0.2 |
| Dry Adhesion | Pass | Pass | Pass | Pass |
| Adhesion after 30' boiling in water | Pass | Pass | Pass | Pass |

Bayer abrasion resistance is determined by measuring the percent haze of a coated and uncoated lens, before and after testing on an oscillating sand abrader as in ASTM F 735-81. The abrader is oscillated for 300 cycles with approximately 500 g of aluminum oxide ($Al_2O_3$) ZF 152412 supplied by Specially Ceramic Grains (former Norton Materials) New Bond Street, PO Box 15137 Worcester, Mass. 01615-00137. The haze is measured using a Pacific Scientific Hazemeter model XL-211. The ratio of the uncoated lens haze (final-initial) is a measure of the performance of the coating, with a higher ratio meaning a higher abrasion resistance.

Steel wool scratch resistance was determined as follows:

The lens was mounted coated surface up with double sided tape on the end of a one inch (2.54 cm) diameter pivoting rod. Steel wool (000 grade) was then pressed against the coated surface with a five pounds (2.267 kg) weight as back-pressure. The lens was then oscillated for 200 cycles against the steel wool (one inch (2.54 cm) travel), and the haze measured. The difference in haze (final-initial) as measured on a Pacific Scientific Hazemeter model XL-211 is reported as the steel wool scratch resistance value.

Coating adhesion was measured by cutting through the coating a series of 10 lines, spaced 1 mm apart, with a razor, followed by a second series of 10 lines, spaced 1 mm apart, at right angles to the first series, forming a crosshatch pattern. After blowing off the crosshatch pattern with an air stream to remove any dust formed during scribing, clear cellophane tape was then applied over the crosshatch pattern, pressed down firmly, and then rapidly pulled away from coating in a direction perpendicular to the coating surface. Application and removal of fresh tape was then repeated two additional times. The lens was then submitted to tinting to determine the percentage adhesion, with tinted areas signifying adhesion failures.

Coating passes adhesion tests when percentage adhesion is more than 95%.

EXAMPLES 3 TO 6

The coating compositions are described in table III Examples

TABLE III

| Component | Ex. 3 | Ex. 4 | Ex. 5 | Ex. 6 |
|---|---|---|---|---|
| n-propanol | 14.22 | 14.22 | 13.73 | 15.77 |
| Tyzor ® DC | — | 0.142 | 0.137 | — |
| Tyzor ® GBA | 0.142 | — | — | — |
| Diacetone alcohol | 14.08 | 14.08 | 13.56 | — |
| UVI 6974 | 0.237 | — | — | 0.158 |
| UVACURE ® 1590 | — | 0.237 | 0.229 | — |
| MA-ST | 47.42 | 47.42 | 45.77 | 52.57 |
| 0.10 N HCl | — | — | 3.48 | 4.00 |
| FC 430 | 0.0948 | 0.0948 | 0.0915 | 0.105 |
| Methanol | 0.0948 | 0.0948 | 0.0915 | 0.105 |
| GLYMO | 23.71 | 23.71 | 22.88 | 26.29 |
| $Al(Acac)_3$ (Aluminum Acetylacetonate) | — | — | — | 1.01 |

The coating compositions are prepared according to the procedure of examples 1 and 2 except that the 0.10 N HCl is not added for examples 3 and 4.

They are applied on 2 mm thickness piano lenses made of CR39® polymer and cured according to the same procedure as in examples 1 and 2.

The coating thickness are 2 μg+/−0.1 μm for examples 3, 4 and 5; and 3.17 μm for example 6.

The results of evaluation of the coated lenses are reported in Table IV.

TABLE IV

| | Ex. 3 | Ex. 4 | Ex. 5 | Ex. 6 |
|---|---|---|---|---|
| ISTM Bayer | 6.13 | 3.85 | 3.46 | 6.91 |
| Steel Wool | 0.09 | 0.18 | 0.12 | 0.23 |
| Dry Adhesion | Pass | Pass | Pass | Pass |
| Adhesion after 30' boiling in water | Pass | Pass | Pass | Pass |
| ASTM haze | 0.15 | 0.11 | 0.13 | 0.14 |

Tyzor ® GBA

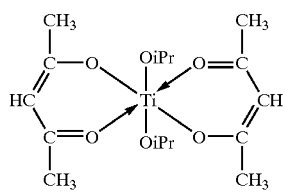

UVACURE ® 1590

Mixture of:

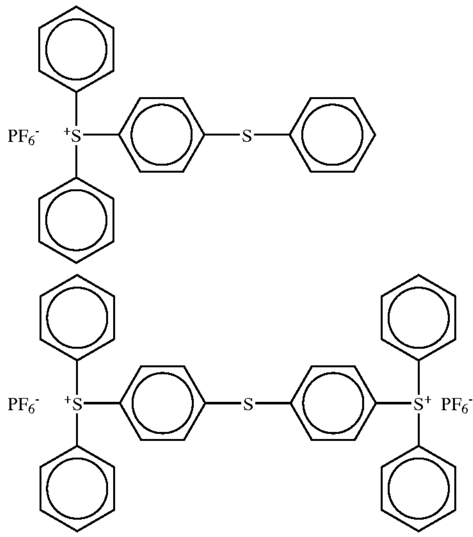

What is claimed is:

1. A process for making an abrasion-resistant coating onto at least one surface of a substrate made of an organic glass which comprises:

(a) preparing a polymerizable composition containing a component A comprising at least one silane compound containing at least one epoxy group and at least two alkoxy groups directly bonded to the Si atom of the molecule or a hydrolysate thereof and a component B comprising fine particles of silica, an effective amount of at least one cationic photopolymerization initiator and an effective amount of at least one thermal polymerization catalyst;

(b) coating at least one surface of the substrate with the composition resulting from step (a);

(c) submitting the coated substrate to a photopolymerization step for pre-curing the coating layer; and thereafter;

(d) submitting the substrate with the pre-cured coating layer thereon to a thermal curing at a predetermined temperature and for a predetermined time to complete curing of the coating layer.

2. The process of claim 1, wherein photopolymerization step (c) comprises irradiating the coated substrate with a UV radiation for less than 1 minute.

3. The process of claim 1, wherein the thermal curing step (d) lasts for less than 1 minute.

4. The process of claim 1, wherein the thermal curing step (d) is effected at a temperature ranging from 50 to 500° C.

5. The process of claim 1, wherein the cationic photoinitiator is selected from the group consisting of aromatic onium salts and iron arene salt complexes.

6. The process of claim 1, wherein the cationic photoinitiator is present in an amount ranging from 0.1 to 3.0%.

7. The process of claim 1, wherein the thermal polymerization catalyst is present in an amount ranging from 0.005% to 0.25%.

8. The process of claim 1, wherein the thermal polymerization catalyst is selected from titanium complexes.

9. The process of claim 1, wherein the thermal polymerization catalyst is a compound of formula:

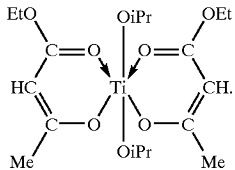

10. The process of claim 1, wherein the silane compound containing at least one epoxy group and at least two alkoxy groups directly bonded to the Si atom of the molecule has formula:

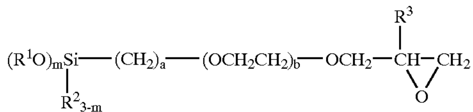

wherein $R^1$ is an alkyl or alkoxy alkyl group having 1 to 4 carbon atoms; $R^2$ is an alkyl or aryl group having 1 to 6 carbons atoms; $R^3$ is hydrogen or methyl group; m is 2 or 3; a is an integer from 1 to 6; and b is 0,1 or 2.

11. The process of claim 1, wherein the silane compound containing at least one epoxy group and at least two alkoxy groups directly bonded to the Si atom of the molecule is selected from the group consisting of γ-glycidoxypropyltrimethoxysilane, γ-glycidoxypropyltriethoxysilane, γ-glycidoxypropylmethyldimethoxysilane, γ-glycidoxypropylmethyldiethoxysilane, γ-glycidoxyethoxypropylmethyldimethoxysilane and mixture thereof.

12. The process of claim 1, wherein coating of the surface of the substrate with the composition is effected by spin coating.

13. The process of claim 1, wherein the substrate is selected from (meth)acrylic resins, diethyleneglycol bisallyl carbonate copolymers, (halogenated) bisphenol-A di(meth) acrylate homopolymers and copolymers, and (halogenated) bisphenol-A urethane-modified.

14. The process of claim 1, wherein the substrate is an optical or ophthalmic lens.

* * * * *

UNITED STATES PATENT AND TRADEMARK OFFICE

CERTIFICATE OF CORRECTION

PATENT NO. : 6,514,574 B1
DATED : February 4, 2003
INVENTOR(S) : Valeri et al.

It is certified that error appears in the above-identified patent and that said Letters Patent is hereby corrected as shown below:

Column 10,
Line 43, please delete "carbons" and insert -- carbon -- therefor.

Signed and Sealed this

Twenty-second Day of July, 2003

JAMES E. ROGAN
*Director of the United States Patent and Trademark Office*